United States Patent [19]

Sugita et al.

[11] Patent Number: 4,859,501

[45] Date of Patent: Aug. 22, 1989

[54] METHOD FOR PROVIDING A PERPENDICULAR RECORDING MEDIUM FOR USE WITH A RING-SHAPED RECORDING AND REPRODUCING HEAD

[75] Inventors: Ryuji Sugita; Kiyokazu Tohma, both of Hirakata; Kazuyoshi Honda, Takatsuki; Taro Nanbu, Kobe, all of Japan

[73] Assignee: Matsushita Electric Industrial Co., Ltd., Kadoma, Japan

[21] Appl. No.: 140,278

[22] Filed: Dec. 31, 1987

Related U.S. Application Data

[63] Continuation-in-part of Ser. No. 843,628, Mar. 25, 1986, abandoned.

[30] Foreign Application Priority Data

Mar. 26, 1985 [JP] Japan .................................. 60-61136
May 24, 1985 [JP] Japan ................................ 60-112421
Jul. 16, 1985 [JP] Japan ................................ 60-156432

[51] Int. Cl.$^4$ ............................................. G11B 5/64
[52] U.S. Cl. .................................... 427/131; 427/35; 427/48; 427/132; 427/250; 427/294; 428/694; 428/900

[58] Field of Search ................. 428/694, 900; 427/131, 427/132, 250, 294, 48, 35

[56] References Cited

U.S. PATENT DOCUMENTS

| | | | |
|---|---|---|---|
| 4,210,946 | 7/1980 | Iwasaki et al. | 428/900 |
| 4,517,257 | 5/1985 | Shimizu et al. | 428/900 |
| 4,576,876 | 3/1986 | Shiiki et al. | 428/900 |
| 4,657,812 | 4/1987 | Hatanai | 428/694 |

OTHER PUBLICATIONS

Sugita et al., IEEE Transactions on Magnetics, vol. MAG 17, No. 6, Nov. 1981, pp. 3172–3173.

Primary Examiner—Paul J. Thibodeau
Attorney, Agent, or Firm—Cushman, Darby & Cushman

[57] ABSTRACT

A perpendicular magnetic recording method uses a perpendicular magnetic recording medium. This medium comprises a perpendicular anisotropy film having perpendicular remanent magnetization Mr and longitudinal remanent magnetization $Mr_{\|}$, wherein the value of the ratio $Mr_{\perp}/Mr_{\|}$ is not less than 0.2, but is less than 1.

14 Claims, 2 Drawing Sheets

$Mr_{\perp}/Mr_{\|}$

METHOD FOR PROVIDING A PERPENDICULAR RECORDING MEDIUM FOR USE WITH A RING-SHAPED RECORDING AND REPRODUCING HEAD

REFERENCE TO RELATED APPLICATION

This is a continuation-in-part of our application Ser. No. 843,628, filed Mar. 25, 1986 and abandoned in favor hereof.

FIELD OF THE INVENTION AND RELATED ART STATEMENT

1. Background of the Invention

The present invention relates generally to a perpendicular magnetic recording method, and more particularly to improvements in recording and reproducing characteristics in high density recordings.

2. Description of the Related Art

The perpendicular magnetic recording medium has been investigated for pursuing higher density recording. The perpendicular magnetic recording medium is suitable for use in shorter wave length recording. The demagnetizing field in the medium decreases as the wave length becomes short, and accordingly a high reproduced output is obtainable in the shorter wave length.

The perpendicular magnetic recording medium has a perpendicular anisotropy film of CoCr CoNiCr, CoV, CoCrRh or the like usually formed by the known sputtering method on the substrate. The sputtering method has a slow deposition rate, and hence is not suitable for mass production of the medium. Vacuum deposition is another method of making the perpendicular magnetic medium, and in the vacuum deposition method, including the evaporation method for ionizing a part of evaporated atoms, as in ion plating the rate of deposition is faster (over 1 micrometer per second) by two figures in comparison with the sputtering method, and hence it is suitable for mass production of the medium. The present inventors already have discovered that a perpendicular anisotropy film of CoCr alloy is obtainable also by the vacuum deposition method. But, no condition for obtaining excellent recording and reproducing characteristics particularly in the range of short wave length has been disclosed yet.

According to an academic report so far available, the relation between the value of the ratio $Mr_\perp/Mr_\|$ and the recording and reproducing characteristics was not paid attention to ($Mr_\perp$ is perpendicular remanent magnetization and $Mr_\|$ is longitudinal remanent magnetization.) According to a reported investigation by Langland et al., "Recording on Perpendicular Anisotropy Media With Ring Heads", IEEE Transaction Magnetics, Vol. MAG-17, No. 6 November 1981, $Mr_\perp/Mr_\|$ ratios of over 1 are shown (See "Media" in column 1 and Table 1). In other papers, similar values for the ratio $Mr_\perp/Mr_\|$ are shown. For instance, see Kobayashi et al. "Magnetic and Structural Properties of Rh substituted Co-Cr Alloy Films With Perpendicular magnetic Anisotropy", Magnetism & Magnetic Materials, J. Appl. Phys. Vol. 52, No. 3, March 1981, FIG. 7; and Barbero et al. "Magnetization Reversal in Sputtered Co-Cr Films" IEEE Transaction of Magnetics, Vol. MAG-18, No. 6, November 1982, FIG. 1. In such conventional papers, it has been a common notion that, it is a matter of course, a magnetic anisotropy film having an $Mr_\perp/Mr_\|$ ratio in excess of 1 is a necessary condition for a perpendicular magnetic recording medium. But a magnetic anisotropy film having such a ratio does not produce a sufficient output level in reproducing.

SUMMARY OF THE INVENTION

A primary purpose of the present invention is to provide an improved perpendicular magnetic recording method wherein excellent recording and reproducing characteristics are achieved, when a ring-shaped head is used. The perpendicular magnetic recording method in accordance with present invention uses a perpendicular magnetic recording medium and a ring shaped-head to record and reproduce on the medium. The perpendicular magnetic recording medium comprising:

a substrate of non magnetic substance, a perpendicular anisotropy film formed on substrate.

The perpendicular anisotropy film has perpendicular remanent magnetization $Mr_\perp$ and longitudinal remanent magnetization $Mr_\|$ where the value of the ratio $Mr_\perp/Mr_\|$ is not less than 0.2 and less than 1.

DESCRIPTION OF THE PREFERRED EMBODIMENTS

Figure 1:
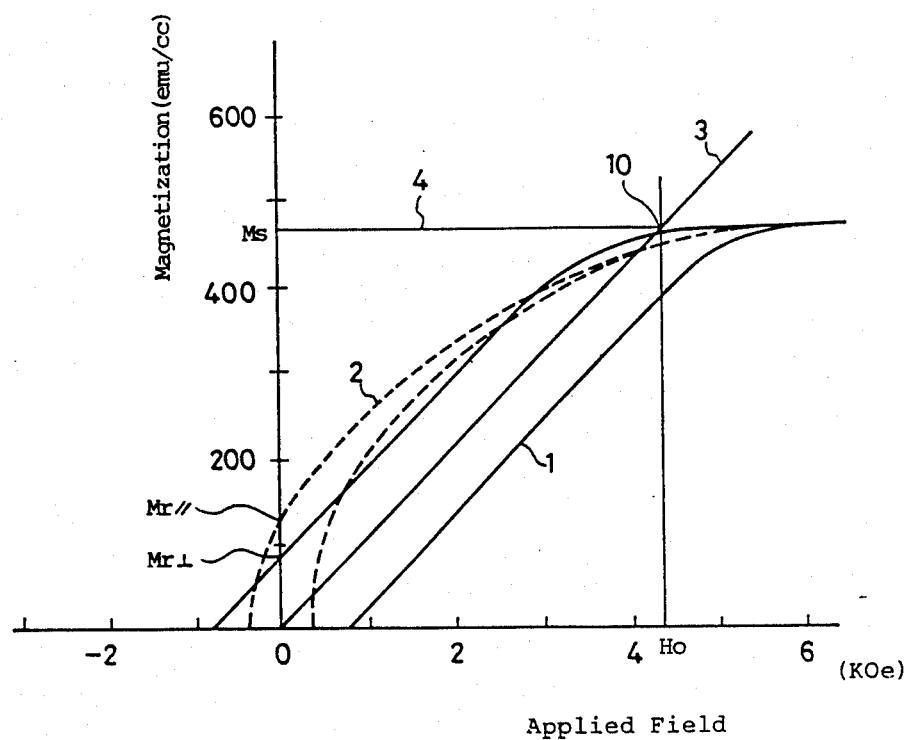
FIG. 1 is a diagram showing an instance of partial hysteresis loops of a perpendicular magnetic recording medium, measured with a vibrating sample magnetometer both perpendicular and longitudinal to a plane of the medium.

FIG. 1 shows an instance of partial hysteresis loops of a perpendicular magnetic recording medium, measured with a vibrating sample magnetometer both perpendicular and longitudinal to a plane of the medium. The X-axis is graduated with the applied field H, and Y-axis is graduated with the magnetization M. A solid line 1 shows a hysteresis loop of the medium in the perpendicular direction. The dotted line 2 shows a hysteresis loop of the medium in the parallel direction (in-plane). Perpendicular remanent magnetization $Mr_\perp$ is remanent magnetization in the perpendicular direction. Longitudinal remanent magnetization $Mr_\|$ is remanent magnetization in the parallel direction. The straight line 3 passes through origin and has the same slope as the slope of the perpendicular hysteresis loop 1 at zero magnetization. The line 4 parallel to X-axis shows a saturation magnetization Ms. Ho is the magnetic field intensity at the intersection point 10 of the lines 3 and 4.

Figure 2:
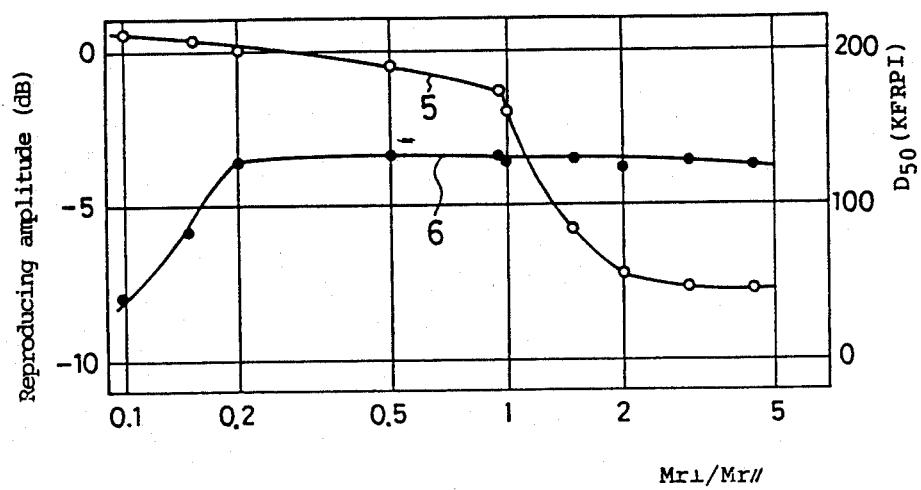
FIG. 2 is a diagram showing relations between the ratio $Mr_\perp/Mr_\|$ and the reproduced signal, and between the ratio $Mr_\perp/Mr_\|$ and $D_{50}$, which is the recording density at which the reproduced signal amplitude becomes 50% of the value at a recording density of one thousand Flux Reversals per Inch.

In FIG. 2 the curve 5 shows the relation between the ratio $Mr_\perp/Mr_\|$ and the reproducing amplitude at low recording density of the perpendicular magnetic recording medium. The medium has a perpendicular anisotropy film of CoCr alloy over a substrate of polymer. A 0.25 micrometer thick CoCr film is formed by vacuum deposition method. The head used for evaluation is a ring-shaped head of MnZn ferrite with a gap of 0.2 micrometer length. As shown in FIG. 2, when the ratio $Mr_\perp/Mr_\|$ is in excess of 1, the reproducing amplitude rapidly drops. When an amorphous head or sendust head was used instead of the MnZn ferrite head, the same characteristics were given.

In FIG. 2 the curve 6 shows relation between the value of the ratio $Mr_\perp/Mr_\|$ and $D_{50}$ which is the recording density at which the reproduced signal amplitude becomes one half of the value at a recording density of 1000 Flux Reversals per Inch (hereinafter referred to as 1000 FRPI or 1 KFRPI). The reproduced amplitudes are shown as values divided by the reproduced amplitudes at a ratio $Mr_\perp/Mr_\|$ of 0.2. "1 Kilo FRPI" means a condition of recording digital signal wherein the magnetization reverses 1000 times per inch. As shown in FIG. 2, when the value of the ratio $Mr_\perp/Mr_\|$ is less than 0.2, the $D_{50}$ value rapidly drops. When an amorphous head or sendust head was used instead of the MnZn ferrite head, the same characteristics were given.

Therefore, for obtaining excellent recording and reproducing characteristics, values for the ratio $Mr_\perp/Mr_\|$ of from 0.2 to 1 are desirable; whereas in the former sense, evidenced from the paper above, values of the ratio $Mr_\perp/Mr_\|$ of in excess of 1 are desirable for film produced by sputtering. A film having a ratio $Mr_\perp/Mr_\|$ of from 0.2 to 1 can be produced under easier conditions than a film having a ratio $Mr_\perp/Mr_\|$ in excess of 1, particularly in the case of a CoCr alloy film produced by the vacuum deposition method. Therefore, the medium according to the present invention is suitable for mass production particularly in the manufacture of vacuum-deposited CoCr film. Recording and reproducing characteristics of a single layer medium having a perpendicular anisotropy film formed directly on the substrate by a ring-shaped head has been described above.

Figure 3:
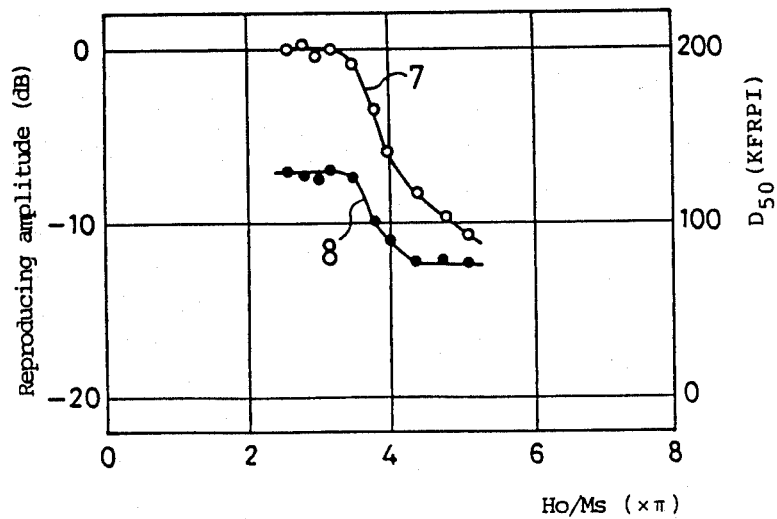
FIG. 3 is a diagram showing relations between the ratio Ho/Ms and the reproduced signal, and the ratio Ho/Ms and $D_{50}$. Ms designates the saturation magnetization and Ho designates the magnetic field intensity at the intersecting point of a first line and a second line in a perpendicular hysteresis loop where the first line and a second line in a perpendicular hysteresis loop where the first line is passing through origin and having the same slope as the slope of the perpendicular hysteresis loop at zero magnetization and the second line is parallel to the X-axis and showing the saturation magnetization Ms.

FIG. 3 shows relations between the ratio Ho/Ms and the reproduced signal, and the ratio Ho/Ms and $D_{50}$. The unit of the saturation magnetization Ms is e.m.u./cm$^3$ and the unit of the magnetic field intensity Ho is Oe. Therefore, the unit of the ratio Ho/Ms is Oe.cm$^3$/e.m.u. In FIG. 3 the curve 7 shows the relation between the ratio Ho/Ms and reproducing amplitude for a low recording density of the perpendicular magnetic recording medium having a value for the ratio $Mr_\perp/Mr_\|$ of from 0.2 to 1. The medium has the perpendicular anisotropy film of CoCr alloy on a substrate of polymer. The 0.25 micrometer thick CoCr film is formed by the vacuum deposition method. The head used for evaluation is a ring-shaped head of MnZn ferrite with a gap of 0.2 micrometer length. As shown in FIG. 3, over $3.5\pi$ Oe.cm$^3$/e.m.u. of the ratio Ho/Ms both the reproducing amplitude and $D_{50}$ rapidly drop.

For obtaining excellent recording and reproducing characteristics, values for the ratio Ho/Ms of no more than $3.5\pi$ Oe.cm$^3$/e.m.u. are therefore desirable. It is not clear yet why the characteristics of the film depend on the ratio Ho/Ms. But it is hypothesized that the characteristics depend on the microscopic composition distribution of the film which is related to the ratio Ho/Ms.

The medium is obtained using normal vacuum deposition method where the electron beam evaporation source is used. The medium is obtained by forming Co-based metal thin film such as CoCr or CoNiCr directly on the non magnetic substrate such as polymer film or on the the under layer such as Ti, Ge or Si etc. formed on the non magnetic substrate. It is a suitable condition for vapor deposition that the substrate temperature is 100° C. to 300° C., the deposition rate is over 0.1 $\mu$m/s and the pressure in the vacuum chamber is $1\times10^{-6}$ to $3\times10^{-4}$ Torr. The composition of the medium is same as that of conventional perpendicular anisotropy film. In case of the medium having Co, Cr as host material, Cr density is 13 wt% to 30 wt%.

The table shows some examples of the perpendicular recording medium with excellent recording and reproducing characteristics, and shows conditions to make them.

TABLE

| Sample | Substrate | Under Layer | Magnetic Layer | Thickness ($\mu$m) | Substrate Temperature (°C.) | Deposition Rate ($\mu$m/s) | Pressure ($\times 10^{-5}$ Torr) | $Mr_\perp/Mr_\|$ | Ho/Ms ($\times \pi \frac{Oe \cdot cm^3}{emu}$) | $Hc_\perp$ (Oe) |
|---|---|---|---|---|---|---|---|---|---|---|
| A | Polyimide | none | 80 wt % Co 20 wt % Cr | 0.23 | 250 | 0.8 | 2 | 0.6 | 3.1 | 560 |
| B | Polyimide | Ti (Thickness = 0.02 $\mu$m) | 80 wt % Co 20 wt % Cr | 0.23 | 250 | 0.8 | 2 | 0.8 | 3.0 | 530 |
| C | Polyimide | Ti (Thickness = 0.02 $\mu$m) | 83 wt % Co 17 wt % Cr | 0.24 | 280 | 1.3 | 6 | 0.5 | 3.3 | 720 |
| D | Polyimide | Ti (Thickness = 0.02 $\mu$m) | 70 wt % Co 10 wt % Ni 20 wt % Cr | 0.26 | 240 | 0.5 | 3 | 0.4 | 3.1 | 500 |
| E | Polyamide | none | 80 wt % Co 20 wt % Cr | 0.22 | 230 | 1.2 | 1 | 0.7 | 3.2 | 410 |
| F | Polyamide | Ti (Thickness = 0.02 $\mu$m) | 80 wt % Co 20 wt % Cr | 0.22 | 230 | 1.2 | 1 | 0.9 | 3.0 | 390 |

TABLE-continued

| Sample | Substrate | Under Layer | Magnetic Layer | Thickness (μm) | Substrate Temperature (°C.) | Deposition Rate (μm/s) | Pressure (× $10^{-5}$ Torr) | Mr⊥/Mr// | Ho/Ms ($\times \pi \frac{Oe \cdot cm^3}{emu}$) | Hc⊥ (Oe) |
|---|---|---|---|---|---|---|---|---|---|---|
| G | Polyamide | Ti (Thickness = 0.02 μm) | 83 wt % Co 17 wt % Cr | 0.21 | 260 | 0.6 | 4 | 0.4 | 3.3 | 510 |

What is claimed is:

1. A perpendicular magnetic recording method, comprising:
   (a) providing a perpendicular magnetic recording medium, by:
      (i) providing a non-magnetic polymeric substrate;
      (ii) in a vacuum deposition chamber maintained at a temperature of 100°-300° C. and at a pressure of $1 \times 10^{-6} - 3 \times 10^{-4}$ torr., vacuum depositing on said substrate at a deposition rate in excess of 0.1 μm/sec., using an electron beam evaporating source, a perpendicular anisotropy film of cobalt-base metal alloy, containing 13-30 weight percent cobalt to thereby obtain a magnetic recording medium having:
         a perpendicular remnant magnetization $Mr_\perp$ and a longitudinal remnant magnetization $Mr_\parallel$ having a ratio $Mr_\perp/Mr_\parallel$ which is less than 1 and not less than 0.2, and
         a ratio of Ho/Ms of no more than $3.5\pi$ Oe.cm$^3$/e.m.u., in which Ho is magnetic field intensity at an intersecting point of a first line and a second line in a perpendicular hysteresis loop, in which said first line passes through the origin and has a slope which is the same as that of said perpendicular hysteresis loop at zero magnetization, and said second line is parallel to an X-axis graduated with magnetic field intensity, and Ms is saturation magnetization; and
   (b) magnetically recording on said recording medium using a ring-shaped head having a gap on the order of 0.2 micrometer.

2. The perpendicular magnetic recording method of claim 1, wherein:
   said non-magnetic polymeric substrate is composed of a polymeric material selected from the group consisting of polyimide and polyamide.

3. The perpendicular magnetic recording method of claim 1, wherein:
   the step of providing a perpendicular magnetic recording medium further includes a sub-step, executed between sub-steps (a)(i) and (a)(ii) of providing said non-magnetic polymeric substrate with an underlayer composed of a material selected from the group consisting of titanium, germanium and silicon.

4. The perpendicular magnetic recording method of claim 3, wherein:
   said non-magnetic polymeric substrate is composed of a polymeric material selected from the group consisting of polyimide and polyamide.

5. The perpendicular magnetic recording method of claim 1, wherein:
   said cobalt-base metal alloy is composed of cobalt alloyed with at least one base metal selected from the group consisting of chromium and chromium-nickel.

6. The perpendicular magnetic recording method of claim 5, wherein:
   said non-magnetic polymeric substrate is composed of a polymeric material selected from the group consisting of polyimide and polyamide.

7. The perpendicular magnetic recording method of claim 6, wherein:
   the step of providing a perpendicular magnetic recording medium further includes a sub-step, executed between sub-steps (a)(i) and (a)(ii) of providing said non-magnetic polymeric substrate with an underlayer composed of a material selected from the group consisting of titanium, germanium and silicon.

8. The perpendicular magnetic recording method of claim 7, wherein:
   the step of providing a perpendicular magnetic recording medium further includes a sub-step, executed between sub-steps (a)(i) and (a)(ii) of providing said non-magnetic polymeric substrate with an underlayer composed of a material selected from the group consisting of titanium, germanium and silicon.

9. The perpendicular magnetic recording method of claim 1, wherein:
   in practicing sub-step (a)(ii), said perpendicular anisotropy film is deposited to a thickness in the range of 0.21-0.26 μm.

10. The perpendicular magnetic recording method of claim 9, wherein:
    in practicing sub-step (a)(ii), said deposition rate is in the range of 0.5-1.2 μm/sec.

11. The perpendicular magnetic recording method of claim 10, wherein:
    in practicing sub-step (a)(ii), said vacuum deposition chamber pressure is maintained in the range of $1 \times 10^{-5}$ to $6 \times 10^{-5}$ torr.

12. The perpendicular magnetic recording method of claim 1, wherein:
    step (a) is practiced to obtain a magnetic recording medium exhibiting a value for $Mr_\perp/Mr_\parallel$ of 0.4-0.9.

13. A perpendicular magnetic recording method, comprising:
    providing a substrate of non-magnetic material;
    forming a cobalt-based perpendicular anisotropy film on said substrate, said cobalt-based anisotropy film having:
        a perpendicular remnant magnetization $Mr_\perp$ and a longitudinal remnant magnetization $Mr_\parallel$ having a ratio $Mr_\perp/Mr_\parallel$ which is less than 1 and not less than 0.2, and
        a ratio of Ho/Ms of no more than $3.5\pi$ Oe.cm$^3$/e.m.u., in which Ho is magnetic field intensity at an intersecting point of a first line and a second line in a perpendicular hysteresis loop, in which said first line passes through the origin and has a slope which is the same as that of said perpendicular hysteresis loop at zero magnetization, and said second line is parallel to an X-axis graduated with magnetic field intensity, and Ms is saturation magnetization; and recording on said cobalt-based perpendicular anisotropy film on said substrate, using a ring-shaped recording head.

14. The perpendicular magnetic recording method of claim 13, wherein:

said cobalt-based perpendicular anisotropy film is formed on said substrate by vacuum deposition.

* * * * *

UNITED STATES PATENT AND TRADEMARK OFFICE
CERTIFICATE OF CORRECTION

PATENT NO. : 4,859,501

DATED : August 22, 1989

INVENTOR(S) : Ryuji Sugita, et al

It is certified that error appears in the above-identified patent and that said Letters Patent is hereby corrected as shown below:

Please change:

IN THE CLAIMS

Claim 1, Line 12, change "cobalt" to --chromium--

Signed and Sealed this

Twenty-eighth Day of August, 1990

Attest:

HARRY F. MANBECK, JR.

Attesting Officer

Commissioner of Patents and Trademarks